May 22, 1945.  E. HODSON ET AL  2,376,772
LIQUID MEASURING DEVICE
Filed Jan. 7, 1943
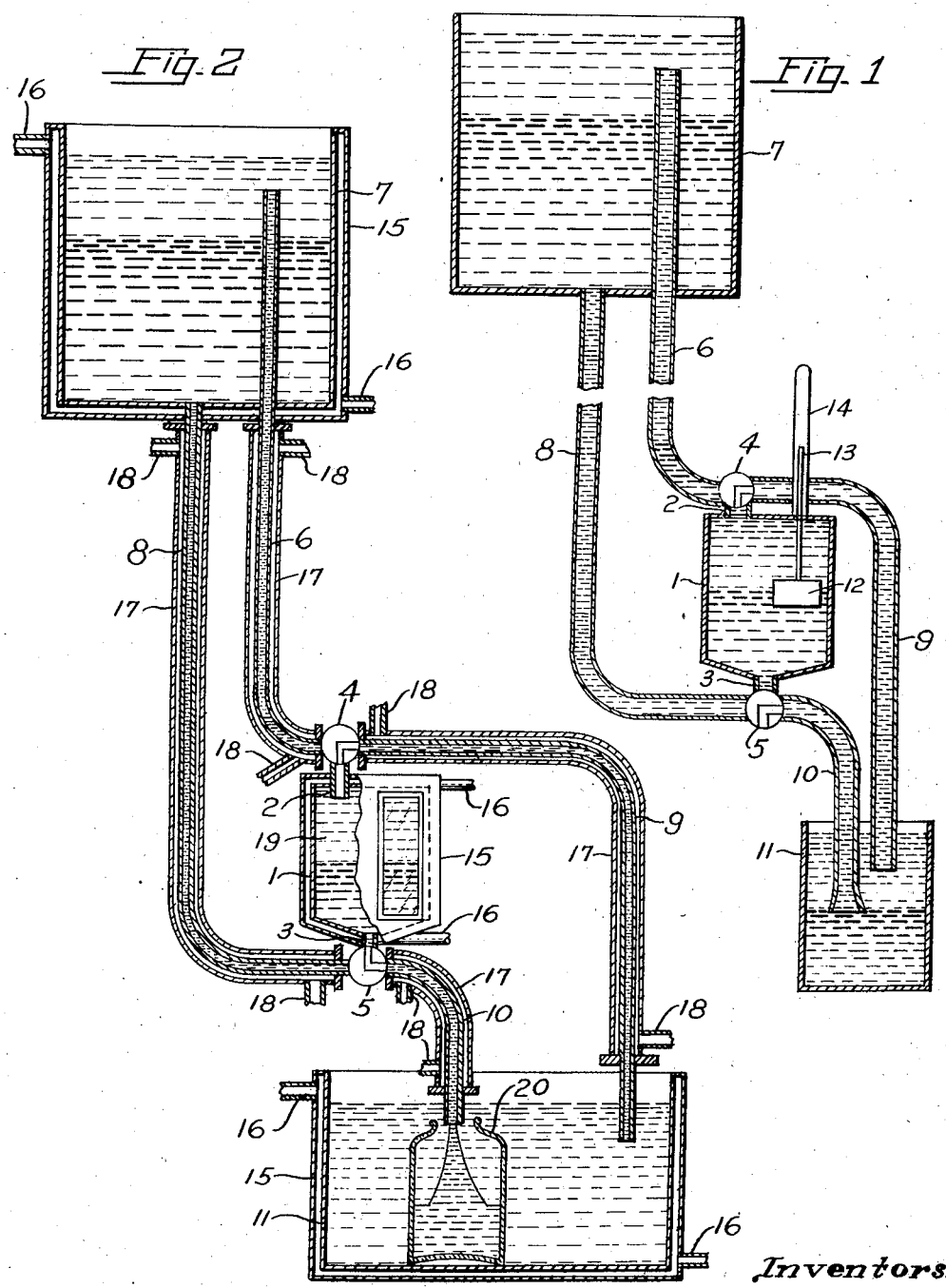
Inventors:
EDMUND HODSON
ROBERT RUSSELL SOUTTER
Howson and Howson,
Attorneys.

Patented May 22, 1945

2,376,772

UNITED STATES PATENT OFFICE 2,376,772

LIQUID MEASURING DEVICE

Edmund Hodson, Tettenhall, Wolverhampton, and Robert Russell Soutter, Wolverhampton, England, assignors to Courtaulds Limited, London, England, a British company Application January 7, 1943, Serial No. 471,602
In Great Britain February 20, 1942

2 Claims. (Cl. 222—117)

This invention relates to the measurement of liquids, especially of liquids which it is desired to keep out of contact with air, and to apparatus for carrying out such measurement. The liquid to be measured is maintained out of contact with the air during the whole of the measuring process by means of an inert covering liquid which is immiscible with the first liquid and of lower specific gravity than the first liquid. The covering liquid may be water or other low specific gravity liquid such as oil, the choice depending on the nature of the liquid to be measured.

In the accompanying drawing

Fig. 1 is a diagrammatic view of one form of apparatus in accordance with this invention; and Fig. 2 is a diagrammatic view of a modification of the apparatus shown in Fig. 1, both figures showing two liquids indicated by light broken and heavy broken lines, respectively.

We will now describe the process and apparatus more fully with reference to the accompanying diagrammatic drawing illustrating apparatus for carrying out the invention. The liquid to be measured is indicated by heavy broken lines and the covering liquid by light broken lines. Referring to Figure 1, the measuring chamber 1 of known capacity is provided with a pipe 2 leading from near the top of the chamber 1 and another pipe 3 leading from near the bottom of the chamber 1. Each of the pipes 2 and 3 is provided, at a short distance from the chamber 1, with a three-way valve marked 4 and 5 respectively. From valve 4 a pipe 6 leads upwards to the reservoir 7 and from valve 5 a pipe 8 leads upwards to the reservoir 7, the pipe 8 ends at or near the lower end of the reservoir 7 whereas the pipe 6 ends at a higher level than pipe 8. A pipe 9 from valve 4 and pipe 10 from valve 5 lead downwards to a vessel 11 adapted to receive the measured quantity of liquid.

When the measuring device, according to this invention is to be used, the measuring chamber and the pipes, as well as the greater part of each of the reservoir and the receiving vessel are filled with the covering liquid which we will hereinafter refer to as "water". Some of the liquid to be measured, hereinafter referred to as the "liquid," is then introduced into the reservoir 7 so that the said reservoir contains liquid to a convenient level covered by a layer of water. The valves 4 and 5 are turned so that both the top pipe 2 and bottom pipe 3 from the measuring chamber 1 are put into connection with the reservoir 7 whereupon liquid flows down the pipe 8 leading from the lower end of the reservoir 7 to the lower end of the chamber 1, displacing water from the pipe 8, the chamber 1 and pipe 6 which water flows through pipe 6 to the reservoir 7. The liquid fills the measuring chamber and passes at least some of the way up pipe 6. The two valves 4 and 5 are now turned to the position shown in the drawing so that they communicate with the pipes 9 and 10 leading to the vessel 11 containing water, whereupon the liquid in the measuring chamber 1 flows out through the pipe 3, the lower valve 5 and the pipe 10 into vessel 11. The ends of both the pipes 9 and 10 terminate below the level of the water in said vessel 11. At the same time, water from the vessel 11 passes up the pipe 9, through valve 4 and pipe 2 into the measuring chamber 1.

The cycle of operations is now complete as the vessel contains the measured quantity of liquid covered by a layer of water. The two valves 4 and 5 are then turned again to open communication with the reservoir 7 and a fresh quantity of liquid will flow from the reservoir 7 into the measuring chamber 1, displacing water which flows upwards into the reservoir.

Any suitable means can be employed to show that the chamber has been filled with the desired quantity of liquid, before the valves 4 and 5 are reversed. For instance, the chamber 1 may contain a float 12 which is heavier than water, but lighter than the liquid, so that it will float on the surface of the latter, while a rod 13 is attached to the float 12 projecting upwards so that it will rise and fall inside a glass tube 14 attached to the top of the chamber. The rod 13 will then indicate the level of the liquid in the chamber. Alternatively, the chamber may be made of transparent material through which the level of the liquid can be observed.

The quantity of liquid to be measured can be easily adjusted, for instance by altering the size of the measuring chamber 1.

When applying the process of the present invention to a substance which is solid at the ordinary temperature, but which melts at a somewhat higher temperature the whole apparatus should be maintained at a raised temperature above the melting point of the substance to be measured. For this purpose as shown in Figure 2, the reservoir 7 can be surrounded by a jacket 15 through which hot water or even steam is passed by means of pipes 16. The measuring chamber 1 and the vessel 11 are likewise maintained at the requisite higher temperature by means of similar jackets 15 and pipes 16. The pipes 6, 8, 9 and 10 may also be enclosed in suitable heating jackets 17 through which hot water or steam may be passed by means of pipes 18. The process is particularly useful for measuring molten white phosphorus using water as the covering liquid.

In Figure 2, the pipe 2 is shown dipping down into the interior of the chamber 1 so that an amount of water will be trapped above the lower end of the pipe 2 each time the chamber is filled with liquid, thereby reducing the amount of liquid measured. The level of the liquid in the chamber 1 can be seen through a window 19 of transparent material. The liquid after measurement is collected in a bottle 20.

The modifications shown in Figure 2, namely the jackets 15 and pipes 16, the jackets 17 and pipes 18, the extended pipe 2, the window 19 and the bottle 20, need not all be used, but any one or more of these modifications may be used without the others.

What we claim is:

1. Apparatus for measuring a liquid out of contact with air, which comprises, in combination, a measuring chamber of known capacity, a reservoir for holding the liquid to be measured situated at a distance above said measuring chamber, a vessel for receiving the liquid which has been measured situated at a distance below said measuring chamber, a pipe leading from near the top of the said measuring chamber, another pipe leading from near the bottom of the said measuring chamber, a three-way valve in each of said pipes, a first pipe from each of said valves leading upwards to said reservoir, the pipe from the upper valve ending nearer the top of the reservoir and the pipe from the lower valve ending nearer the bottom of the said reservoir, and a second pipe from each of said valves leading downwards to the said vessel and ending within the vessel.

2. Apparatus as claimed in claim 1 in which means are provided in the said measuring chamber for indicating the level of the liquid in the said chamber.

EDMUND HODSON.
ROBERT RUSSELL SOUTTER.